United States Patent [19]
Joice et al.

[11] Patent Number: 5,509,807
[45] Date of Patent: Apr. 23, 1996

[54] CONFLAGRATION SIMULATOR AND METHOD OF OPERATING

[75] Inventors: Gary T. C. Joice, Stouffville; Graham A. Huxley, Beeton, both of Canada

[73] Assignee: CanCode Safety Services, Inc., Markum, Canada

[21] Appl. No.: 411,852

[22] Filed: Mar. 28, 1995

Related U.S. Application Data

[63] Continuation of Ser. No. 42,101, Apr. 1, 1993, abandoned.

[51] Int. Cl.⁶ ..................................................... G09B 19/00
[52] U.S. Cl. .......................................... 434/226; 431/191
[58] Field of Search ........................... 434/226; 431/191, 431/350, 353

[56] References Cited

U.S. PATENT DOCUMENTS

| | | | |
|---|---|---|---|
| 3,038,064 | 6/1962 | Gieb | 431/125 |
| 3,260,465 | 7/1966 | Grumbein | 431/353 |
| 3,298,420 | 1/1967 | Blanzy | 431/191 |
| 3,675,342 | 7/1972 | Wolff | 434/226 |
| 3,892,519 | 7/1975 | Reed et al. | 431/202 |
| 4,303,396 | 12/1981 | Swiatosz | 434/226 |
| 4,445,846 | 5/1984 | Mattingly | 431/352 |
| 4,861,270 | 8/1989 | Ernst et al. | 434/226 |
| 4,983,124 | 1/1991 | Ernst et al. | 434/226 |
| 5,052,933 | 10/1991 | Rogers et al. | 434/226 |
| 5,055,050 | 10/1991 | Rogers et al. | 434/226 |
| 5,131,840 | 7/1992 | Zettner | 431/353 |

*Primary Examiner*—Nicholas D. Lucchesi
*Assistant Examiner*—Jeffrey A. Smith
*Attorney, Agent, or Firm*—Jones & Askew

[57] ABSTRACT

The present invention relates to an apparatus for igniting and maintaining a simulated training fire for the purpose of teaching individuals to combat, contain and extinguish various classes, signatures and intensities of fires. More specifically, the present invention relates to a pilot flame ignition apparatus for use with a combustion tank, to provide a substantially inextinguishable pilot flame during and subsequent to the presence of a conflagration in the tank, the pilot flame being substantially impervious to the ingress of fire fighting agents into the tank.

19 Claims, 4 Drawing Sheets

Fig_6

CONFLAGRATION SIMULATOR AND METHOD OF OPERATING

This is a continuation of application Ser. No. 08/042,101 filed Apr. 1, 1993 (abandoned).

TECHNICAL FIELD

The present invention relates, in general, to methods and devices for simulating various classes, signatures and intensities of fires for the purpose of training individuals to combat, contain and extinguish such fires. More particularly, the present invention relates to a method and apparatus for igniting and maintaining a simulated training fire. The ignition system of the present invention is particularly suited for use with over-water combustion systems in which gaseous or liquid fuels are bubbled through a liquid dispersing medium and ignited at the surface of the liquid.

BACKGROUND OF THE INVENTION

Accidental fires are an ever-present phenomenon, and the provision of fire fighting equipment and the training of civilians as well as firefighters to handle fire fighting equipment effectively is an important and ongoing task.

A statistically significant number of accidents, ranging from minor burns or blisters to life threatening injuries, are associated with fire fighting training. Approximately 6000 injuries resulting from accidents which occurred during fire fighting training are reported each year. Additionally, approximately 6 deaths are reported each year as a result of accidents which occurred during fire fighting training exercises. These accidents are unnecessary and preventable; and, attributable in large part to fire fighting training methods and training equipment.

Over the past several decades, controlled "real fires", set in special buildings or open pits constructed of concrete, metal, or a combination of both, have been used to teach individuals basic fire fighting skills. Simulating "real fires" became a popular training method because the controlled fires create a realistic fire scenario without creating undue risk to the trainees.

The controlled "real fire" training methods and facilities have a number of drawbacks. For example, the facilities are expensive to construct and maintain. They are fixed in location, such that participants must travel to the facilities to obtain training. And, such "real" fires create conditions of considerable danger, are difficult to control, and generate unduly high temperatures. The temperatures of these controlled "real" fires can reach approximately 1200 to 1400 degrees F., which is greatly in excess of 550 degrees F., the maximum temperature tolerated by fire resistant safety suits. Finally, the fuels and methods used to ignite the fires generate large quantities of atmospheric pollution, as well as ground pollution.

The fire fighting training industry has made efforts to overcome the drawbacks associated with traditional training techniques. Examples of various fire fighting training devices are provided in the following United States patents: U.S. Pat. No. 5,055,050 to Rogers, et al., issued Oct. 8, 1991; U.S. Pat. No. 5,052,933 to Rogers et al., issued Oct. 1, 1991; U.S. Pat. No. 4,983,124 to Ernst et al., issued Jan. 8, 1991; U.S. Pat. No. 4,861,270 to Ernst et al., issued Aug. 29, 1989; U.S. Pat. No. 4,303,396 to Swiatosz, issued Dec. 1, 1981; and, U.S. Pat. No. 3,675,342 to Wolff, issued Jul. 11, 1972.

Of particular interest to the present invention is U.S. Pat. No. 5,055,050 to Rogers et al. which describes a fire fighting training device which uses an over-water combustion system. Gaseous combustion over water is also described in U.S. Pat. No. 3,038,054, which is directed to a decorative garden torch. U.S. Pat. No. 5,055,050 discloses a fire fighting trainer for use in training fire fighters to extinguish jet crash fuel fires and the like. The training apparatus comprises a fuel supply pipe and control valve, a perforated fuel distribution pipe, and an open top tank containing water within which the distribution pipe is disposed. When the supply pipe is opened, liquid fuel, preferably propane, passes through the perforations of the distribution pipe and is released into the water. The fuel passes as a vapor to the surface of the water and, due to its density, collects on the water's surface. U.S. Pat. No. 5,055,050 discloses that a gas pilot flame device may be used to ignite the vapor to form flames on the surface of the water, but does not disclose the structure of a suitable ignition system.

The simple ignition system described in U.S. Pat. No. 5,055,050 is suitable only to initiate ignition. The practical realities of a fire fighting training exercise make use of the ignition system during the course of the exercise impractcal and potentially dangerous. For example, during a training exercise, large quantities of liquid propane fuel are projected through the water bath. As the liquid propane passes through the water, the majority of it flashes to gas and is ignited. When it flashes to gas and is ignited, the propane expands in volume approximately 900 times. The liquid propane which does not flash to gas and ignite collects at the surface of the water and creates dangerous flammable pockets. It is important that the ignition pilot system is capable of maintaining a pilot flame so that the fuel burns off the surface of the water and does not accumulate. This potential hazard is not addressed by U.S. Pat. No. 5,055,050.

Additionally, the volume of water within the training tank rapidly increases during the training exercise as various fire fighting agents, such as foams, dry chemicals and water, are applied to the fire in an attempt to extinguish it. As a consequence, some of the gas is temporarily absorbed in the bath and overflows with the liquid contents of the bath.

The experience of the present inventors over the last decade in developing over-water combustion systems for use in fire fighting training devices similar to that described in U.S. Pat. No. 5,055,050, has shown that the accumulation of propane gas in and about the apparatus during the fire fighting training exercise is a common occurrence. The dangers of this situation are compounded by the fact that the injected smell ingredient normally added to the propane to facilitate its detection becomes absorbed by the water so that the presence of extraneous, non-combusted gas is not evident by smell. Furthermore, the stoichiometric or combustible gas concentrations may not be consistently and continuously present, but may evolve over time, subsequent to a burn.

There is also a continuing threat that the unprotected pilot flame will be extinguished by the fire fighting agents being applied to the simulated fire. Hence, for the safety of the individuals using training devices which utilize an over-water combustion system it is critical to ensure the continuing presence of an unquenched pilot flame of significant size, capable of igniting persisting gas traces both during and after the main burn, even when the apparatus is shut down, and the burn terminated.

U.S. Pat. No. 4,983,124 to Ernst et al. discloses an ignition system intended to enhance the stability of a pilot flame during the application of various extinguishing agents to a fire fighting training device similar to the "real" fire training systems described herein. The device disclosed in U.S. Pat. No. 4,983,124 comprises a pilot chamber into which a pilot gas/air mixture is introduced from a burner control enclosure via a pilot nozzle. The mixture is ignited using a rear-mounted spark igniter which provides spark within the nozzle igniting the gas/air mixture before it exits the nozzle. Once ignited, the stability of the flame is enhanced by the introduction of additional air into the pilot chamber. The air surrounds the nozzle and pilot flame, providing available combustion air to the pilot flame if the environmental conditions at the burner require changes in the fuel/air ratio.

The device described in U.S. Pa. No. 4,983,124 is designed to be used with a dry system and is not suited for use in an over-water combustion system. The ignition system and pilot guard assembly disclosed in U.S. Pat. No. 4,983,124 would not sufficiently protect the pilot flame from extinguishing, nor is it suitable for igniting the type of fuel used in an over-water combustion system.

Thus, what is needed in the art is a pilot ignition system which provides for a constant and stable flame under fire fighting training conditions which is of significant size, and is capable of igniting persisting gas traces both during and after the main burn, even when the apparatus is shut down, and the burn terminated.

SUMMARY OF THE INVENTION

The present invention relates to an apparatus for igniting and maintaining a simulated training fire for the purpose of teaching individuals to combat, contain and extinguish various classes, signatures and intensities of fires. More specifically, the present invention relates to a pilot flame ignition apparatus for use with a water combustion tank, to provide a substantially inextinguishable pilot flame during and subsequent to the presence of a conflagration in the tank, the pilot flame being substantially impervious to the ingress of fire fighting agents into the tank.

The pilot flame ignition apparatus of the present invention includes an independently controlled fuel supply, an independently controlled oxygen supply, and an independently energized ignition means which terminates in an ignition control system. The ignition control system of the present apparatus further comprises a primary pilot chamber and a second pilot guard which encases and surrounds the primary pilot chamber.

It is an object of the present invention to provide an ignition system for igniting fire training devices which utilize a water combustion conflagration system, wherein the ignition system is substantially protected from the fire figthing agents applied to the simulated fire.

It is another object of the present invention to provide an ignition system for a fire fighting training apparatus wherein the pilot flame of the apparatus is substantially stable.

Other objects, features, and advantages of the present invention will become apparent upon reading the following detailed description of the preferred embodiment of the invention when taken in conjunction with the drawing and the appended claims.

BRIEF DESCRIPTION OF THE DRAWINGS

Certain embodiments of the present invention are described herein, without limitation of the invention thereto, reference being made to the accompanying drawings wherein.

DETAILED DESCRIPTION

In accordance with the method of the apparatus of the present invention, a mixture of oxygen and fuel is introduced into a combustion chamber connected to a primary pilot flame tube where it is ignited by an ignition means. The ignition means may be electrical and may be 12 or 24 volt DC, or a combination thereof, or may be supplied by either a fixed or portable AC power source. The oxygen and fuel mixture are introduced into the primary pilot flame tube at sufficient pressure to prevent fire fighting agents from entering the primary pilot chamber. Oxygen is also forced through the second pilot guard, either from an independent oxygen source or from the same source as that fed into the primary pilot chamber, such that it surrounds the primary pilot chamber.

In a preferred embodiment of the present invention, the primary pilot flame tube and the outer pilot guard surrounding the primary pilot flame tube comprise elongated, cylindrical tubes, the pilot guard being of a diameter sufficiently large to encase the primary pilot flame tube. The pilot flame tube and outer pilot guard extend out of the ignition system and over a tank where the simulated fire is to be created.

The electrical circuitry for initiating the ignition spark and/or for opening or closing the fuel, oxygen and electrical supply lines may be hard wired, with or without electrical magnetic control systems. It may also be hard wired in conjunction with computer based circuitry and/or with wireless initiating control devices.

The oxygen for use in the ignition system of the present invention may be supplied from compressed air tanks or cylinders, fixed or portable compressors, fixed or portable air pumps, fixed or portable air supply fans, or by any other means known in the art.

The subject apparatus may be interconnected with safety interlocked sensors and/or lockout devices. It may also be interconnected with air movement appliances or devices and with artificial smoke generating appliances.

The subject apparatus, when incorporated into an over-water combustion system for simulating fires, may be used for training individuals to handle a broad range of fire fighting equipment because it may be used with a variety of different simulators. For example, the ignition system of the present invention may be used with small pan fixed or portable over-water combustion systems. Additionally, the apparatus may be used with fixed or portable large pan over-water combustion systems, including transportable pans or enclosures which may be used to form fire training pits up to 200 square feet in size. Portable simulators are beneficial in that they enable individuals to be trained near, or even within their working locations, and avoid the expense of traveling to a fixed installation and the resultant loss of work time.

The apparatus may be incorporated into fire fighting training devices for use indoors or out of doors. Also, it may be used in a variety of settings, in conjunction with other facilities to realistically simulate disaster scenarios such as aircraft crash sites and house fires. The ignition system of the present invention can be used for aircraft, marine, road transportation, structural and hazardous equipment mock-ups.

The size of a fire pan stipulated by the National Fire Protection Association (NFPA) of the United States is two feet by three feet for basic training. The subject apparatus may be incorporated with this, or with a 4-foot by 5-foot combustion tank, which also is portable and can be interconnected to create a variety of fire signatures. The device of the present invention may be used with simulators either individually or with multiple simulators arranged in various layouts or configurations suitable to a particular training exercise.

In a preferred embodiment the subject ignition system may be installed at one end of a combustion tank, having the elongated slotted barrel of the primary pilot flame tube extending longitudinally into the tank in substantial coincidence with the main axis of the tank, and the downward facing slot openings of the primary pilot flame tube preferably located above, and in close proximity to the surface of the water in the combustion tank.

Protective side flanges minimize the impact of impinging fire fighting agents but allow the fire to be attacked from the most advantageous angle by the trainees, regardless of the direction of the primary pilot flame tube. The tank water level is regulated by an overflow stand pipe located within the tank, such that the ingress of liquid and solid fire fighting agents into the tank does not effectively raise the level of liquid within the tank.

The presence of fire fighting agents on the surface of the water does not cause impingement into the tube, being effectively overcome by the presence of the ignitor flame, which exceeds atmospheric pressure, owing to the over pressure of the fuel and air supplies.

The end of the primary pilot flame tube is open to the atmosphere, tending to project an ignitor flame therefrom, and precluding any choking tendency caused by temporary obfuscation of the fire tube slot or slots due to undue bubbling of the tank water contents under full fuel flow, maximum conflagration conditions.

It will be understood that when teaching individuals fire fighting techniques, the water combustion simulator does not react in the manner of a normal class A, B, C, or D fire because of the liquid surface dynamics generated through the release of vapor. Accordingly, the efforts of the individuals when dealing with the fire requires regulation of the main fuel supply, as a conditioned feed back, to motivate and reward the individuals, as an indication of having followed correct procedures. This responsive fuel regulation is effected by the operator of the simulator, who holds a manually operated regulating switch device to affect such regulation of the main fuel supply, with consequent modulation of the fire.

Manual control of the simulator by a qualified operator is recommended. Manual control allows the instructor to adjust the size, scope and intensity of the main training fire according to the type and scope of the fire training exercise.

The controlling device may be hand held with a single or multi-position control for effecting various fuel supply settings. It also may optionally have a dead-man on/off switch, which is held in the deactivated condition by the thumb or by the grasp of the operator. When the instructor releases his grip, or relaxes thumb pressure, the sytem shuts down. The use of radio control for system shut-down, or the additional provision of radio controlled shut-down over-ride devices are also contemplated.

The two modules of the subject apparatus comprise:
1) a combustion tank (which can be cart mounted), and,
2) a fuel and oxygen (air) supply, with the ignitor energy supply.

In the preferred embodiment, the two modules are mounted on carts and the carts are readily handled by a single individual, thereby permitting a single trained instructor to transport and set up the module elements of the system, and to then exercise an effective supervisory training role.

The carts may comprise the appliance-transporter type of cart, incorporating two wheels and with supporting tread belts to facilitate traversing stairs and loading and unloading from a pick-up truck.

The present invention thus provides a pilot igniter flame apparatus for continuously igniting combustible gases in a combustion-hostile environment, the apparatus comprising a housing having a combustible gas source, an oxygen source and an ignition source connected thereto; a flame tube projecting from the housing for the outward passage there through of combusting gas, the flame tube having an extended outlet area for the access of gases there through, the outlet being downwardly oriented in protective relation, in use, with the combusting, to prevent dousing thereof, in use.

The aforesaid apparatus preferably includes protective baffle means to substantially preclude the impingement of quenching media into the flame tube.

The flame igniter preferably may comprise an electronic ignition, such as a low voltage arrangement, including a power back therefor. The power pack may comprise of 12-volt battery.

The invention further comprises the aforesaid pilot igniter flame apparatus in combustion with a water bath including combustion-gas evolving means.

The combined water bath and ignitor may be cart mounted, to facilitate transportation thereof.

The combustible gas source, the oxygen source, and the self-contained ignitor energy means may all be mounted upon a wheeled cart for ready transportation thereof.

The present invention further provides a dead-man remote controlling means connected by cable to the apparatus.

The present invention further comprises a conflagration simulator system, having a substantially inextinguishable pilot flame generator for use in combination with a combustion water bath, the operation thereof comprising the steps of locating the bath in a desired location for fire fighting, and filling the bath with water to a predetermined depth; connecting a first fuel supply to the bath and an oxygen supply and an ignition energy source to the pilot flame generator; activating the ignition energy source and the pilot flame ignitor apparatus which establishes pilot fuel supply and the oxygen supply to establish a pilot flame adjacent the surface of the water: and activator burner fuel supply, whereby fuel rises above the water and is ignited into a conflagration; the pilot flame being maintained alight during activation of the burner fuel supply, to ensure completed combustion of substantially all fuel released from the burner fuel supply. A hand-held wand ignitor may also be used to initiate combustion.

Figures 1, 3:
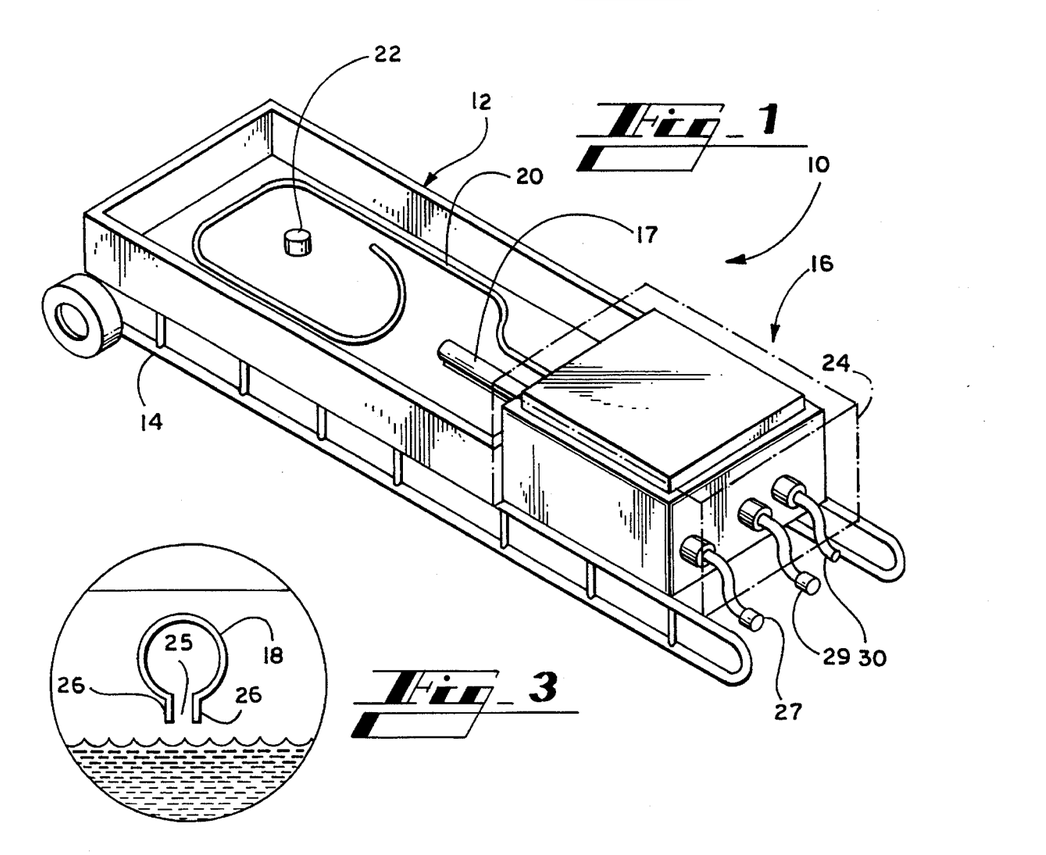
FIG. 1 is a perspective view of a cart-mounted combustion tank.
FIG. 3 is a partial schematic front and taken at 3—3 of FIG. 2.
Figure 2:
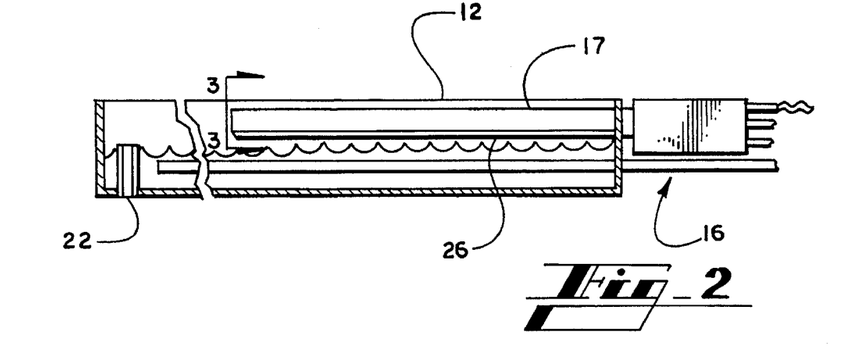
FIG. 2 is a schematic side view, in section, of the tank portion of the FIG. 1 embodiment.

Referring to FIGS. 1, 2, and 3, the combustor module 10 comprises a tank 12 mounted upon a cart 14, with ignitor and burner control housing 16 at the rear end, and the pilot flame tube 17 of the pilot ignitor projecting forwardly thereof. The main burn fuel supply pipe 20 also extends from the housing 16, being located at the bottom of the tank 12. Pipe 22 serves as the overflow drain, and determines the water level within the tank 12. The pilot flame tube 17 is provided with a slot opening 25 having protective side flanges 26, to limit the ingress of impinging fire suppressants, laterally, into the pilot flame tube 17.

Propane connection 27, air tube 29 and electrical connection 30 extend rearwardly of the housing 16. If desired, a plurality of air tube connections can be included. A removable stainless steel flame guard cover 24 is shown in phantom.

Figures 4, 5:
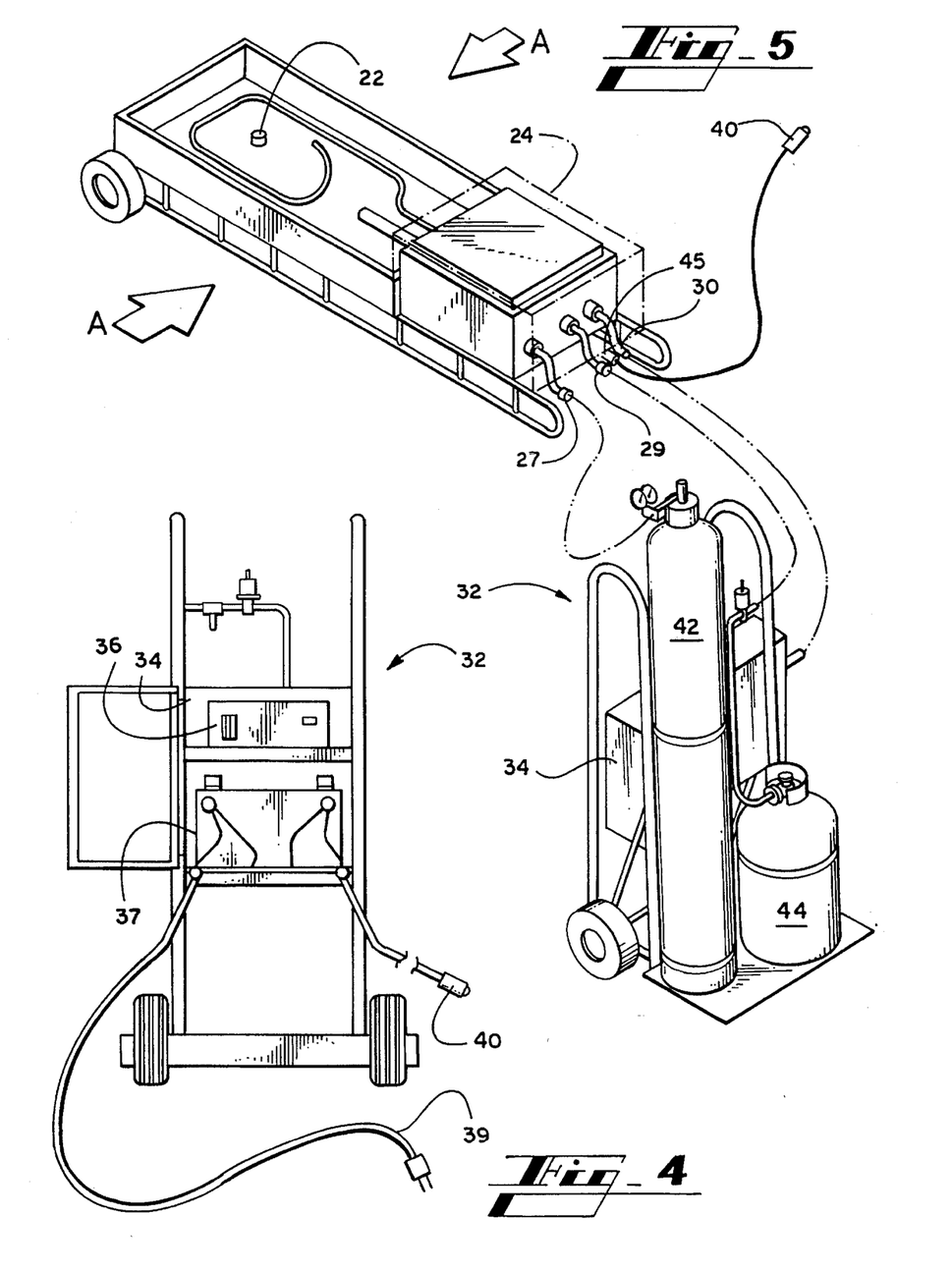
FIG. 4 is a schematic rear view of the cart-mounted control module, with fuel-air ignition provisions.
FIG. 5 is a perspective view from the rear showing the tank-module and the supply and control module in connected relation.

Referring to FIGS. 4 and 5, a second cart module 32 includes an electrical control cabinet 34 with a 115-volt battery charger 35 for 12-volt battery 37.

Referring to FIG. 5 in which the arrows "A" indicate the "attack" directions of the trainees, along the sides of the tank 12, being directed normal to the main axis of the pilot flame tube 17 as suggested but not limited to direction of attack. The cart 32 also carries propane supply 44, and air supply 42, which connect to quick disconnect hose connectors 27 and 29, respectively, of the tank cart module 10. A remote control 40 connects with tank cart module to connector 45 in shut down relation therewith.

Figure 6:
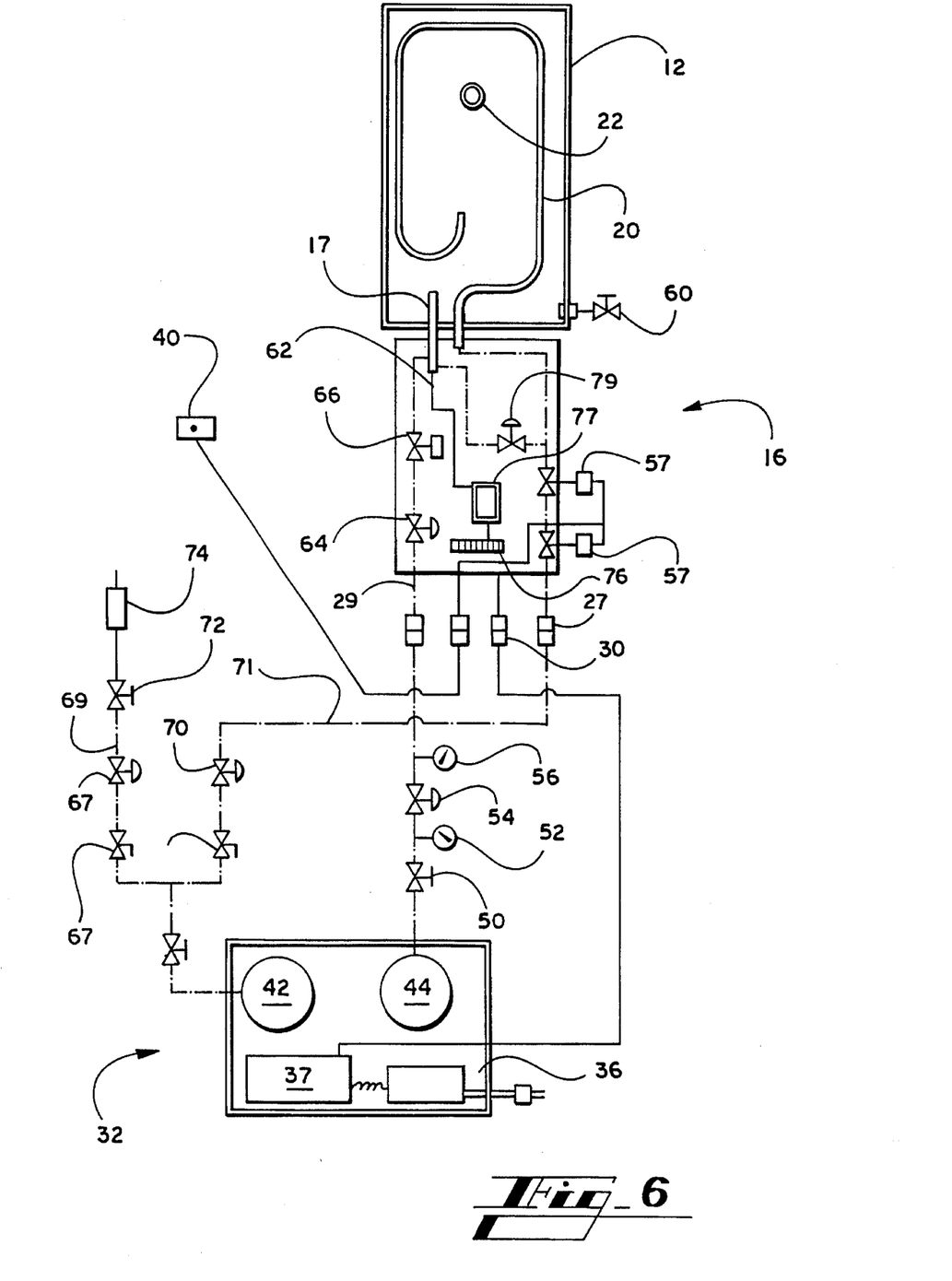
FIG. 6 is a schematic view of the system of the present invention.

Referring to FIG. 6, the control system 16 is in controlling relation with the pilot burner of pilot flame tube 17. A drain vane 60 serves to empty the tank 12.

The propane supply 42 has outlet valve 65. Dual feed lines connect with fast acting, quarter turn close off cocks 67, which connect with pressure regulating valves 70. One feed line 69 connects with hand-held light-up wand 74, which is equipped with an adjustable pressure regulating shut off valve 72, for manual ignition of the system.

The second propane gas feed line 71 connects with the control housing 16, through an optional quick disconnect 27, to two electrical solenoid shut-off valves 57, providing a double-block positive gas shut-off, actuated by the dead-man control 40.

Figure 7:
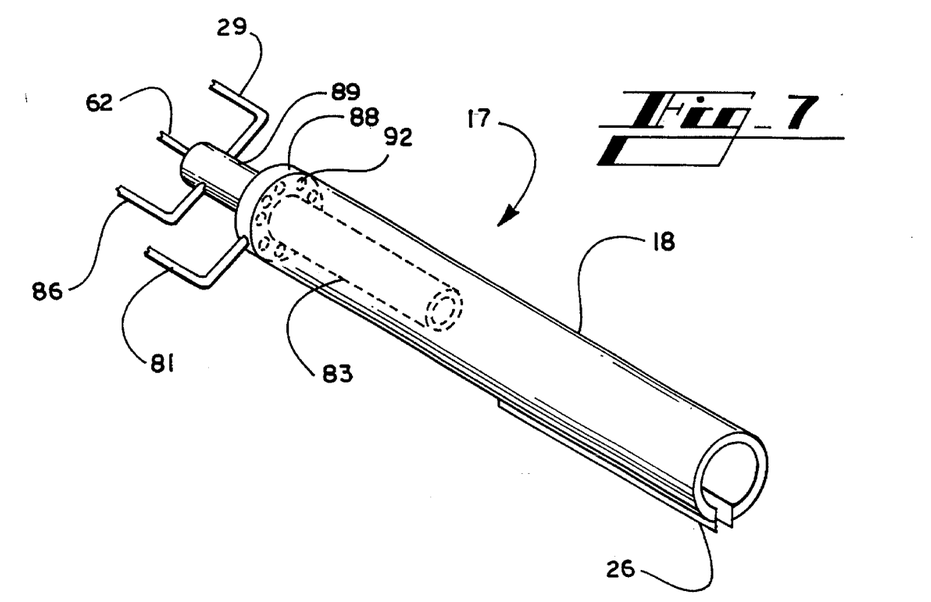
FIG. 7 is a perspective view of the flame tube apparatus.
Figure 8:
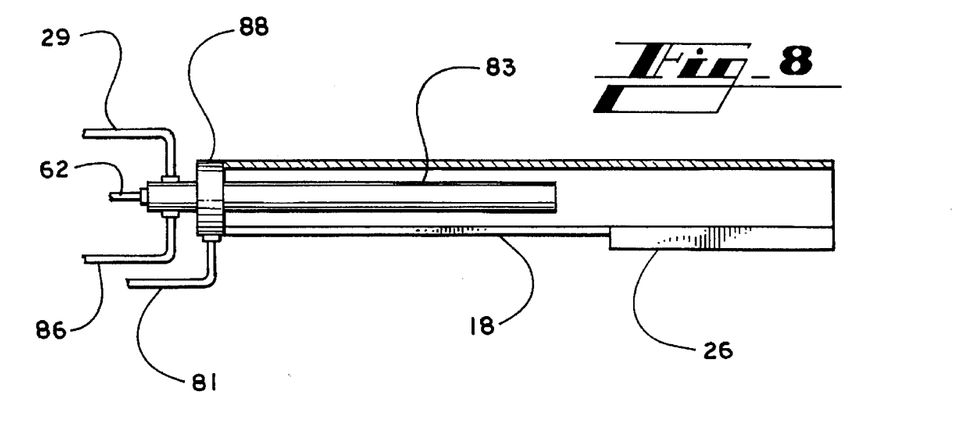
FIG. 8 is a side view of the flame tube apparatus.
Figure 9:
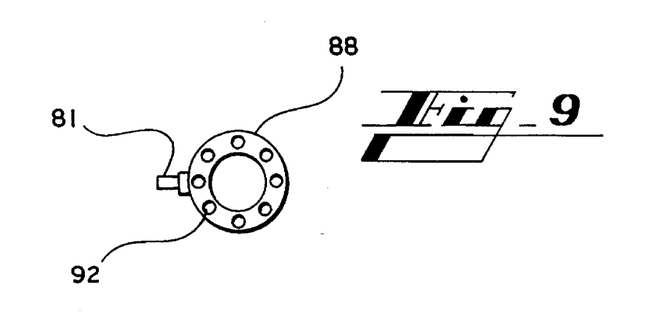
FIG. 9 is an end view of the air supply cap.

An important element of the present invention is the structure of the pilot flame tube 17. Referring to FIGS. 7, 8 and 9, the pilot flame tube 17 comprises an outer pilot guard 18 having a slot opening 25 with protective side flanges 26. The outer pilot guard 18 surrounds and encases a primary pilot flame tube 83 which extends from an air supply cap 88. A secondary air supply connection 81 extends from the exterior of the air supply cap 88. The air supply cap 88 has a plurality of air diffusion openings 92 around its outer perimeter and opening onto the interior of the outer pilot guard 18. Air is admitted into the interior of the outer pilot guard 18 through the air diffusion openings 92, but may also be supplied by the primary air supply 29 to the air supply cap 88 and then into the interior of the outer pilot guard 18.

As shown in FIGS. 7 and 8, the ignition system of the present invention further comprises an electrical ignitor 62 which extends from a combustion chamber 89 which is connected to the rear of the air supply cap 88 such that it is positioned opposite from the pilot flame tube 17. A propane or natural gas supply 86 and a primary air supply 29 extend from the combustion chamber 89. When air enters the combustion chamber 89 through the primary air supply 29, and fuel is admitted to the combustion chamber 89 through the propane or natural gas supply 86, the air and fuel mixture is ignited by the electrical ignitor. The flame created by the combustion extends down the length of the pilot flame tube 17 to ignite the vapors which have collected on the surface of the water in the tank 12.

In use, a trained operator can readily off-load and position the two modules of the system in a desired training location. The modules are readily connected together and prepared for action. Such preparation includes filling the combustor tank 12 to the overflow level of stand-pipe 22.

With the trainees suitably garbed and equipped with the prescribed fire fighting equipment suited to their case of duty, the fuel pressure regulating valves are set to a predetermined setting to give an appropriate level of burn. The pilot flame is than usually ignited and its purpose explained to the trainees.

The main burner gas supply is then turned on, and the extinguishing exercise commenced. During this exercise the operator retains the dead-man switch in a de-activated condition, so that the burn can proceed.

In some instances it may be advisable for the operator to initially demonstrate the total effectiveness of the dead-man control to a neophyte group of trainees, to overcome any fear of the situation. During the burn, as the trainees show a certain level of proficiency commensurate with their expected performance, the operator will reduce the intensity of the burn, as a feed-back to "reward" the participants for their efforts.

It will be understood by those skilled in the art that the existence of an unquenchable pilot light adds significantly to the safety of such proceedings, particularly in view of the intense conflagration that can ensue with a maximum burn.

While this invention has been described in specific detail with reference to the disclosed embodiments, it will be understood that many variations and modifications may be effected within the spirit and scope of the invention as described in the appended claims.

What is claimed is:

1. A pilot igniter flame apparatus for continuously igniting combustible gases comprising, a housing defining a housing chamber therein and having a combustible fuel source for providing a combustible fuel to the housing chamber, a first oxygen source for providing a first source of combustion oxygen to the housing chamber, and an ignition source connected thereto;

an elongate flame tube, comprising a tubular wall portion, projecting from the housing for the outward passage there through of combusting gas, the flame tube extending substantially horizontally from said housing and defining a first outlet aperture extending along a lower portion of the flame tube and opening through the tube wall for the passage of combusting gases there through, said first outlet aperture being disposed so as to provide a pilot flame source along an extended portion of the length of said flame tube to cause combustible gases to which said pilot igniter is exposed, to combust.

2. The flame igniter as set forth in claim 1, including a protective baffle assembly adjacent said first outlet aperture to substantially preclude the impingement of quenching media through said first outlet aperture into said flame tube during normal usage.

3. The apparatus of claim 2 wherein said protective baffle assembly includes opposed baffle plates engaged with said flame tube sidewall adjacent said first outlet aperture and extending downwardly from the flame tube.

4. The flame igniter as set forth in claim 1, said ignition source comprising an electronic igniter, and electrical energy supply means connected therewith.

5. The flame igniter as set forth in claim 4, in combination with a gas-evolving water bath, said gas cylinder and said electrical energy supply means being mounted upon a cart, for transportation therewith.

6. The combination as set forth in claim 5, including remote control means in controlling relation with said apparatus, to terminate flame propagating operation thereof.

7. The combination as set forth in claim 6, said remote control means including a portable control switch having a dead-man operation, and connecting by cable to said apparatus.

8. The pilot igniter of claim 1, wherein said housing further comprises a combustion manifold defining a combustion chamber therein, said combustion chamber being disposed in fluid communication with said first oxygen source and said combustible fuel source, the combustion oxygen and said combustible fuel mixing within said combustion chamber to provide a combustible gas-oxygen mixture thereat, said ignition source being effective to cause the combustible gas-oxygen mixture to be ignited within said combustion chamber; and, wherein said pilot igniter further includes a primary flame tube disposed in fluid communication with and extending from said combustion chamber and disposed within and in coaxial relation to said flame tube, the primary flame tube being effective to direct the flow of combustion gasses from the combustion chamber and into the flame tube.

9. The pilot igniter of claim 8 wherein said primary flame tube and said flame tube are disposed and arranged so as to form an annulus between portions of the primary flame tube and portions of the flame tube; and, wherein the pilot igniter further includes a second oxygen source in fluid communication with said housing for providing a second source of combustion oxygen to flow within and through said annulus between said primary flame tube and said flame tube to provide a source of oxygen for combustion of fuel flowing out of the primary flame tube.

10. The apparatus of claim 9 wherein said second oxygen source is a compressed gas oxygen source for delivering a second source of combustion oxygen under positive pressure to said annulus between said primary flame tube and said flame tube.

11. The apparatus of claim 1 wherein said first oxygen source is a compressed gas oxygen source for delivering a first source of combustion oxygen under positive pressure to said housing chamber.

12. The flame igniter as set forth in claim 11, wherein said compressed gas oxygen source comprises a compressed air supply, and said combustible fuel source comprises a compressed gas cylinder.

13. A method of operating a conflagration simulator system having a substantially inextinguishable pilot flame generator for use in combination with a portable water combustion system comprising the steps of:

(a) positioning the water combustion system a desired location for fire fighting and filling it with water to a predetermined level;

(b) making a first combustion fuel source connection to the water combustion system;

(c) making an oxygen source connection and an ignition energy source connection to the water combustion system;

(d) activating the ignition energy source and the connected fuel supply and the oxygen supply to establish a pilot flame adjacent the surface of the water contained in the water combustion system;

(e) activating the connected combustion fuel source so as to cause combustion fuel to rise through the water and be ignited into a conflagration flame by the pilot flame;

(f) maintaining the pilot flame alight during activation of said connected combustion fuel source; and (g) maintaining the level of water in the water combustion system at said predetermined level while the conflagration flame remains alight.

14. The method of claim 13, wherein the conflagration simulator system further comprises remote control means in controlling relation with the conflagration simulator to terminate flame propagation thereof, the remote control means including a portable control switch having a dead-man operation, further including the step of, before step (e), de-activating the dead-man switch to permit the activation of the connected combustion fuel source to cause fuel to rise through water and maintaining the dead-man switch in the de-activated state to allow the conflagration flame to continue.

15. A conflagration simulator for fire fighting training, comprising:

a combustion tank comprising a tank bottom portion and an upstanding sidewall portion extending from said bottom portion and defining an interior volume therein for containing a water bath therein;

a burner assembly comprising a burner pipe, disposed within the combustion tank, for providing a distributed supply of fluid combustion fuel within said combustion tank;

a pilot ignitor assembly for continuously igniting the combustion fuel supplied by said burner assembly;

a combustion fuel source and a combustion oxygen source for supplying a fluid combustion fuel and combustion oxygen to said burner assembly and said pilot ignitor assembly;

a control assembly for selectively controlling the flow of said fluid combustion fuel and said combustion oxygen to said burner assembly and said pilot ignitor assembly; and water level control means for maintaining a predetermined level of water in said combustion tank, said water level control means including a water level overflow tube defining a tube bore therethrough and having a submerged end disposed in liquid fight engagement with said combustion tank such that said tube bore opens to the atmosphere, and an opposed overflow end extending a predetermined level above the bottom portion of said combustion tank such that as the water level of the water bath contained in the combustion tank increases to a level greater than the predetermined depth, water will flow over and into the overflow end, through the tube bore and out the submerged end so as to maintain the water level at the predetermined level.

16. The apparatus of claim 15 wherein said opposed overflow end of said overflow tube is disposed and arranged so as to prevent the pilot ignitor assembly from being at least partially submerged in said water bath.

17. The apparatus of claim 15 wherein said pilot ignitor assembly includes:

a housing defining a housing chamber therein and having a combustible fuel source for providing a combustible fuel to the housing chamber, a first oxygen source for providing a first source of combustion oxygen to the housing chamber, and an ignition source connected thereto;

an elongate flame tube, comprising a tubular wall portion, projecting from the housing for the outward passage there through of combusting gas, the flame tube extending substantially horizontally from said housing and defining a first outlet aperture extending along a lower portion of the flame tube and opening through the tube wall for the passage of combusting gases there through, said first outlet aperture being disposed so as to provide an ignition source along an extended portion of the length of said flame tube to cause combustible gases in a hostile environment, to which said pilot igniter is exposed, to combust.

18. The apparatus of claim 17 wherein said control assembly includes remote control means in controlling relation with said conflagration simulator to selectively and remotely control the flow of combustion fuel to said burner assembly.

19. The apparatus of claim 18 wherein said remote control means includes a portable control switch, having a deadman operation, in controlling relation with said control assembly.

* * * * *